Patented Oct. 7, 1947

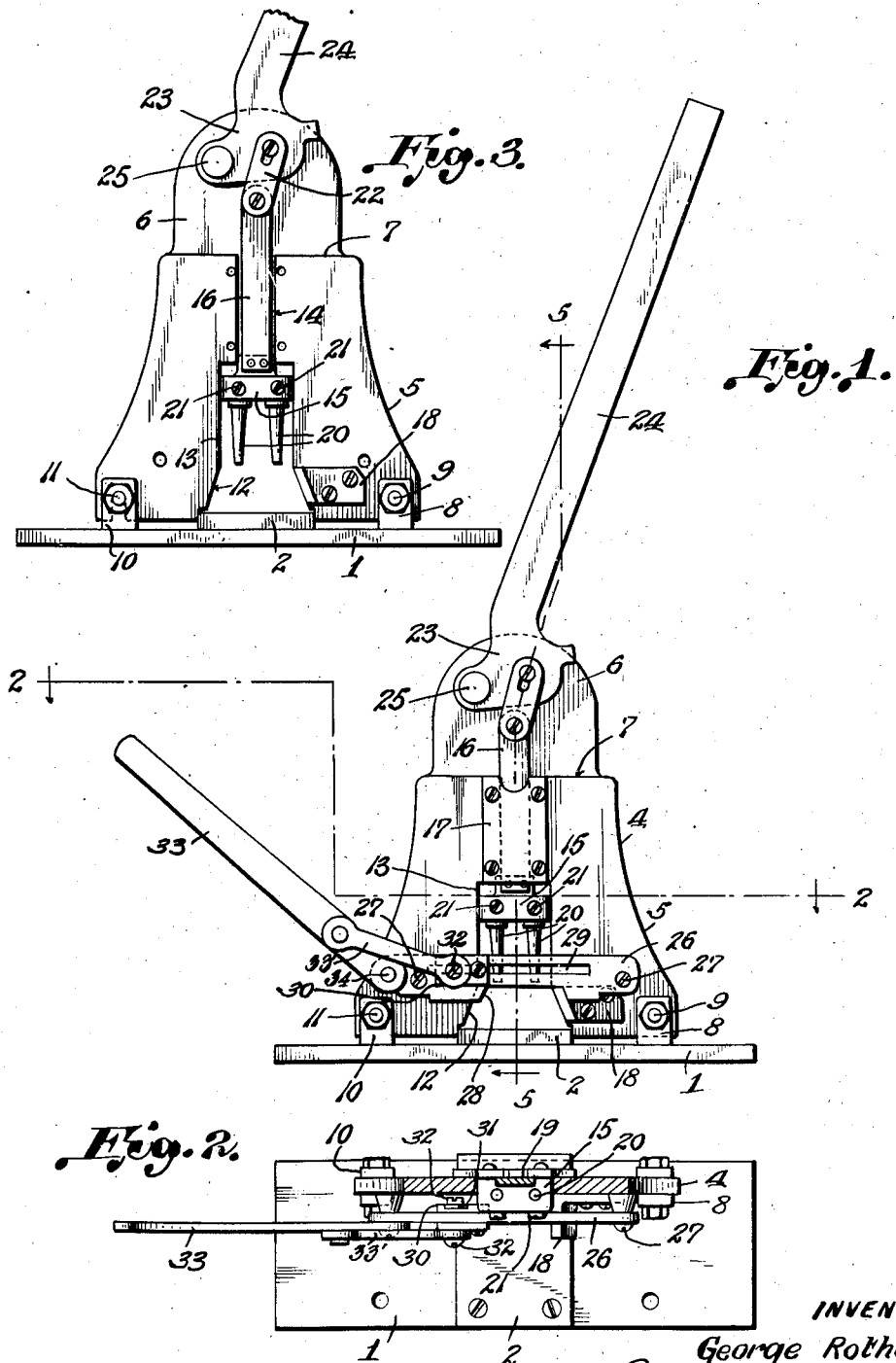

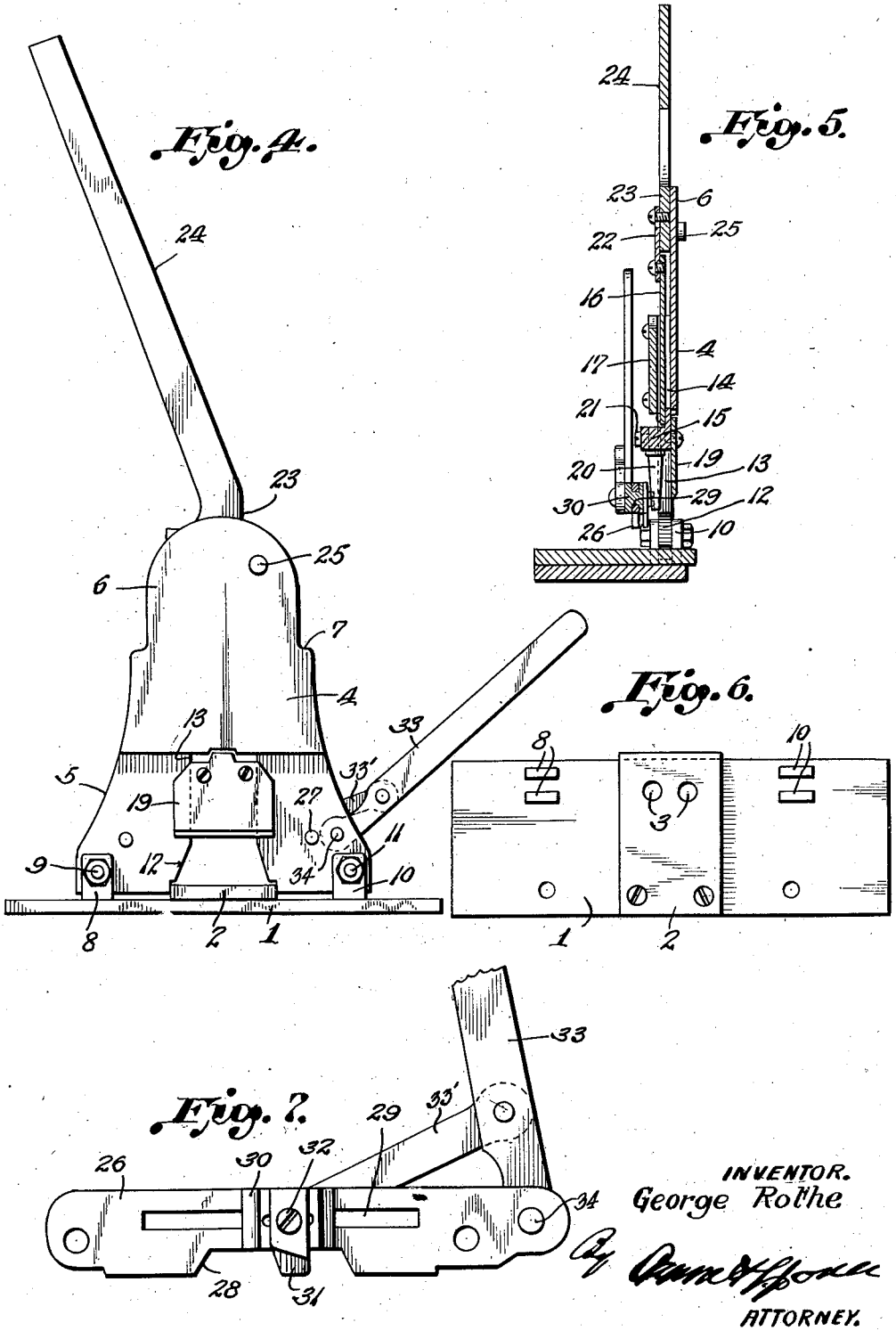

2,428,742

UNITED STATES PATENT OFFICE 2,428,742

BELT CUTTING, PUNCHING, AND GROOVING DEVICE

George Rothe, Council Bluffs, Iowa

Application May 31, 1945, Serial No. 596,875

7 Claims. (Cl. 164—14)

This invention relates to a belt cutting, punching and grooving device for use in cutting and punching or cutting, punching and grooving the ends of belts to prepare them for the application of fastening means to connect adjacent ends of belts together.

One object of the invention is to provide a simple, reliable and efficient type of device whereby an end of a cog or other belt may be clamped and firmly held and then truly square cut and punched or pierced for the reception of fastening means in a quick, ready and convenient manner.

Another object of the invention is to provide a device whereby an end of a straight or V-belt may be cut, punched and grooved for the reception of a fastener employed to couple belt ends of this kind together.

The invention consists of the novel features of construction, combination and arrangement of parts, hereinafter fully described and claimed, and as shown in the accompanying drawing, in which:

Figure 1 is a front view of my invention.

Figure 2 is a section on line 2—2 of Figure 1.

Figure 3 is a view similar to Figure 1 with various parts omitted to clearly illustrate the device.

Figure 4 is a rear view of the device.

Figure 5 is a section on line 5—5 of Figure 1.

Figure 6 is a plan view of the bed plate, and

Figure 7 is a rear elevation of moving knife and bar.

Referring now more particularly to the drawing, 1 designates a base plate, adapted to be secured to or supported on a work bench or other suitable support, and which has formed thereon or secured thereto a bed plate 2 having plunger receiving openings or recesses 3 therein and which serves as a support for the belt to be treated to rest upon.

Arranged above the plate 1 is an upright 4 serving as a clamping member to clamp the belt against the plate 2 and as a support for the belt cutting, punching and grooving tools and their operating means. This upright is in the form of a more or less flat plate of truncate triangular shape which tapers upwardly from its basal edge 5 and is provided at one side with an extension 6 projecting above its top edge 7.

The upright 4 is fitted at one of its lower end corners between a pair of mounting lugs 8 projecting upwardly from the base 1, and is pivoted to said lugs by a pivot pin, rivet or bolt 9. The opposite lower end corner of the upright is adapted to fit down between a pair of keeper lugs 10 projecting upwardly from the base 1 and said end corner and lugs are apertured for the passage of a fastening pin or bolt 11 whereby the upright is adapted to be secured in normal position to the plate 1. The removal of the pin 11 adapts the upright to be swung upward on the pivot 9 to permit the belt to be treated to be rested face downward on the bed plate 2, after which by swinging the upright downward to normal position and re-applying the bolt 11 the upright will be secured in normal working position and will operate to hold the belt down and firmly clamped against plate 3 while it is being operated upon. After the belt is operated upon it may be released by swinging the upright upwardly, as will be readily understood.

Formed in the upright 4 is a slot having a truncated triangular or inverted V-shaped belt receiving portion 12, which opens at its base through the lower edge of the upright, and having an upper guide portion 13 opening at its lower end into the portion 12 and communicating at its upper end with a groove 14 formed in one side of the upper portion of the upright. The slot portion 12 is adapted to accommodate a V or other shaped belt of suitable width which rests upon the plate 2 and against the opposed end walls of the said slot portion 12, while the slot portion 13 and groove 14 provide for the reception and up and down guiding movements of a tool carrying head 15 and its shank or push and pull arm 16, which latter projects upward beyond the groove. A cover plate 17 is provided to close the open side of the groove at one side of the upright and an angular gauge or abutment plate 18 may be provided at one side of the upright and at the end of the slot portion 12 adjacent the pivot 9 to gauge and support the belt against transverse movement while it is being cut and punched or cut, punched and grooved.

The head 15 projects beyond opposite sides of the upright and has attached thereto at one side a cutter blade 19 and carries at its opposite side a pair of plungers or piercers 20 which on a downward movement of the head operate to cut a clamped belt squarely and to form clear holes therein for the reception of fastening means. The piercers pass down through the belt and into the recesses or holes 3 in the plate 2 to form clear holes in the belt. They fit at their upper ends in openings in the head 15 and are detachably secured thereto by clamping screws 21. The shank or arm 16 is coupled by a link 22 to an eccentric or crank projection 23 at one end of an operating lever 24 which is pivoted at such end as shown at 25 to the extension, whereby by downward and upward swinging movements of the lever the cutter and punchers may be advanced for a working operation and thereafter retracted.

The device as thus far described is adapted for cutting and punching belts, such as cog belts, but I also provide a means for grooving as well as cutting other belts, such as straight type V-belts in which a cut groove will serve the same purpose as the cog of a cog belt so far as cooperation with a coupling is concerned. As shown, a guide bar 26 extends across the slot 12 and longitudinally at the side of the upright at which the punches are arranged. This bar is detachably secured in position by fastenings 27 and has a recess 28 in its lower edge for passage of the belt and is formed with a longitudinal guide slot 29. A holder 30 is fitted to slide in said slot and carries a grooving blade 31 which is secured to the holder by a headed screw 32 which passes through and is movable in the slot and also serves to mount the holder for sliding movement on the bar. An operating lever 33 is pivoted, as shown at 34, to the bar and to a link 33' which in turn is pivoted to the holder 30 by means of screw 32 to advance and retract the grooving blade 31.

The operation of cutting and punching a cog belt is as follows:

The belt is placed top side down (broad side) on the horizontal base. The vertical base is locked in place over the belt. This operation secures the belt at right angles to the vertical base. The lever is lowered, forcing the push-pull arm down. To the push-pull arm are secured the cutting knife and the two punches. When the push-pull arm is lowered completely, the belt will have been cut through, at a perfect right angle, and two holes will have been punched by the self-cleaning punches. The vertical base is then raised and the belt removed. The belt is then ready for coupling.

The operation of cutting, punching, and grooving a "straight" belt (Gates, Goodyear, etc.) is as follows:

The operations for cutting, etc., a "straight" type V-belt are the same as for a "cog" belt, except that after the vertical base is locked in place over the belt, the small lever to which the grooving knife is attached is moved from one side of the vertical base to the opposite, thus cutting a small groove in the bottom of the belt. This small groove will serve the same purpose, as far as the couplings are concerned, as the "cog" in the Dayton belts. That is, it will allow the lip of the coupling to serve its function as a gripping device.

After the groove is cut, the remaining operations are identical with those listed for the "cog" belt.

From the foregoing description, taken in connection with the drawings, the construction and mode of use of my improved belt cutting, punching and grooving device will be readily understood by those versed in the art, and it will be seen that the invention provides a device whereby a belt may be easily and conveniently cut and punched or cut, punched and grooved in an accurate and time-saving manner. While the structure disclosed is preferred, it will, of course, be understood that changes in the form, construction and arrangement of parts may be made without departing from the spirit or sacrificing any of the advantages of the invention.

Having thus described my invention, I claim:

1. A belt cutting and punching device comprising a base, an upright supporting and clamping member pivotally mounted on the base on a horizontal transverse axis for swinging movements into and out of belt clamping position, a vertically movable slide mounted on said member, belt cutting and punching elements mounted on said slide, a lever pivotally mounted at one end at the top of the slide and having a lateral crank projection at its pivoted end, and a link connection between said projection and the slide.

2. A belt cutting and punching device comprising a base, an upright supporting and belt-clamping and releasing member rising from the base and pivotally connected thereto for swinging movements into and out of belt-clamping position, said member having a clamping surface and a slot opening therethrough to receive a belt and to adapt the belt to be clamped between said clamping surface and the base, belt-cutting and punching elements mounted on said member for vertical movements toward and from the base, and means for operating said elements.

3. A belt cutting and punching device comprising a base, an upright supporting and belt-clamping and releasing member rising from the base, said member having a clamping surface and a slot opening therethrough to receive a belt and to adapt the belt to be clamped between said clamping surface and the base, and said member being pivotally connected adjacent one end of its clamping surface to the base for swinging movements into and out of belt-clamping position, means for securing said member of its clamping surface opposite end in belt clamping position relative to the base, belt-cutting and punching elements mounted on said member for vertical movements toward and from the base, and means for operating said elements.

4. A belt cutting, punching and grooving device comprising a base, a supporting and belt-clamping and releasing member pivotally mounted on the base for swinging movements into and out of belt-clamping position and having a clamping surface to clamp the belt against the base, belt cutting and punching elements movably mounted on said member, means for operating said elements, a transverse guide carried by said member and arranged adjacent to and parallel with its clamping surface, a belt grooving element mounted on said guide for reciprocating movement in a horizontal plane across the clamped belt, and means for operating the grooving element.

5. A belt cutting and punching device comprising a base, an upright supporting and belt-clamping and releasing member rising from the base, and pivotally connected at one end to the base for swinging movements into and out of belt clamping position, said member having a vertical slot opening through its base to receive a belt and to adapt the belt to be clamped between the member and the base, means for securing said member at its opposite end in belt-clamping position to the base, a tool carrying head vertically movable in the slot, belt cutting and punching tools mounted on said head for movements toward and from the base, and operating means connected to the head.

6. A belt cutting, punching and grooving device comprising a base, a supporting and belt-clamping and releasing member pivotally mounted on the base for swinging movements into and out of belt-clamping position and having a clamping surface to clamp the belt against the base, said member having a vertical slot opening through its clamping surface to receive a belt and to adapt the belt to be received therein and clamped between the member and the base, a tool carrying head vertically movable in the slot, cutting and punching tools carried by the head, means for operating said head, a guide carried by the member and extending across said slot adjacent to said clamping surface, a belt grooving element mounted on said guide for reciprocating movement in a plane parallel with the clamping surface across the clamped belt, and means mounted on said member for operating the grooving element.

7. A belt cutting and punching device comprising a base, an upright supporting and clamping member pivotally mounted on the base for swinging movements into and out of clamping position and having a clamping surface to clamp the belt against the base, means for securing the same in clamping position, vertically movable belt cutting and punching elements mounted on said member, an operating lever pivotally mounted on the member, and a crank and link connection between said member and cutting and punching elements.

GEORGE ROTHE.

REFERENCES CITED

The following references are of record in the file of this patent:

UNITED STATES PATENTS

| Number | Name | Date |
|---|---|---|
| 1,736,559 | Vollrath | Nov. 19, 1929 |
| 2,031,977 | Olsen | Feb. 25, 1936 |
| 2,248,642 | Phillips | July 8, 1941 |
| 1,089,587 | Rowe | Mar. 10, 1914 |
| 2,248,111 | Nassimbene | July 8, 1941 |
| 1,808,041 | Johnson, Jr., et al. | June 2, 1931 |

FOREIGN PATENTS

| Number | Country | Date |
|---|---|---|
| 12,702 | Great Britain | May 31, 1913 |